(12) United States Patent
Henry (10) Patent No.: US 11,810,285 B2
(45) Date of Patent: Nov. 7, 2023

(54) SYSTEM AND METHOD FOR DETERMINING SOIL CLOD PARAMETERS OF A FIELD USING THREE-DIMENSIONAL IMAGE DATA

(71) Applicant: CNH Industrial Canada, Ltd., Saskatoon (CA)

(72) Inventor: James W. Henry, Saskatoon (CA)

(73) Assignee: CNH INDUSTRIAL CANADA, LTD., Saskatoon (CA)

( * ) Notice: Subject to any disclaimer, the term of this patent is extended or adjusted under 35 U.S.C. 154(b) by 135 days.

(21) Appl. No.: 17/202,735

(22) Filed: Mar. 16, 2021

(65) Prior Publication Data

US 2022/0301142 A1    Sep. 22, 2022

(51) Int. Cl.
*G06T 7/00* (2017.01)
*A01B 69/00* (2006.01)
*A01B 79/00* (2006.01)

(52) U.S. Cl.
CPC .......... *G06T 7/0004* (2013.01); *A01B 69/001* (2013.01); *A01B 79/005* (2013.01);
(Continued)

(58) Field of Classification Search
CPC ......... G06T 7/0004; G06T 2207/10028; G06T 2207/30188; A01B 69/001; A01B 79/005
(Continued)

(56) References Cited

U.S. PATENT DOCUMENTS 4,769,700 A    9/1988  Pryor
5,927,603 A    7/1999  McNabb
(Continued)

FOREIGN PATENT DOCUMENTS

WO    WO 2018/234733    12/2018
WO    WO 2018/167215     9/2019
(Continued)

OTHER PUBLICATIONS

Moreno, et al., "Shadow Analysis: A Method for Measuring Soil Surface Roughness", Ciudad Universitaria, Madrid, Spain, dated Jan. 1, 2008. (8 pages).
(Continued)

*Primary Examiner* — Michael R Neff
(74) *Attorney, Agent, or Firm* — Rebecca Henkel; Rickard DeMille (57) ABSTRACT

A method for determining soil clod parameters within a field includes receiving, with a computing system, three-dimensional image data depicting an imaged portion of the field. The three-dimensional image data, in turn, includes a first two-dimensional image depicting the imaged portion of the field relative to a first position and a second two-dimensional image depicting the imaged portion of the field relative to a second position, with the first position being spaced apart from the second position. Furthermore, the method includes identifying, with the computing system, a soil clod depicted with the received three-dimensional image data. Additionally, the method includes comparing, with the computing system, the first and second two-dimensional images to identify a shadow surrounding at least a portion of the identified soil clod. Moreover, the method includes determining, with the computing system, a soil clod parameter associated with the identified soil clod based on the identified shadow.

14 Claims, 5 Drawing Sheets

(52) U.S. Cl.
CPC ............... *G06T 2207/10028* (2013.01); *G06T 2207/30188* (2013.01)

(58) Field of Classification Search
USPC .......................................................... 382/110
See application file for complete search history.

(56) References Cited

U.S. PATENT DOCUMENTS

| | | | |
|---|---|---|---|
| 6,462,813 | B1 * | 10/2002 | Haven ................. G01N 21/8806 250/559.48 |
| 9,282,688 | B2 | 3/2016 | Casper et al. |
| 9,734,400 | B2 | 8/2017 | Shriver |
| 10,028,424 | B2 | 7/2018 | Zemenchik et al. |
| 10,255,670 | B1 | 4/2019 | Wu et al. |
| 10,262,206 | B2 | 4/2019 | Posselius |
| 10,438,343 | B2 | 10/2019 | Baurer et al. |
| 10,650,538 | B2 | 5/2020 | Ferrari et al. |
| 10,916,028 | B1 | 2/2021 | Barrick |
| 2004/0149893 | A1 | 8/2004 | Scott |
| 2015/0015697 | A1 | 1/2015 | Redden et al. |
| 2016/0029547 | A1 | 2/2016 | Casper |
| 2016/0054235 | A1 | 2/2016 | Kim |
| 2018/0206393 | A1 | 7/2018 | Stoller et al. |
| 2018/0310469 | A1 | 11/2018 | Posselius et al. |
| 2018/0310474 | A1 | 11/2018 | Posselius et al. |
| 2019/0095710 | A1 | 3/2019 | Rees et al. |
| 2019/0141880 | A1 | 5/2019 | Zemenchik |
| 2019/0392263 | A1 | 12/2019 | Ferrari et al. |
| 2022/0101557 | A1 * | 3/2022 | Niday ................... G06V 20/56 |

FOREIGN PATENT DOCUMENTS

| | | |
|---|---|---|
| WO | WO 2019/201614 | 10/2019 |
| WO | WO 2021/030399 A1 | 2/2021 |
| WO | WO-2021034872 A1 * | 2/2021 ............. A01B 27/00 |

OTHER PUBLICATIONS

Extended European Search Report for corresponding EP Application No. 22161604, dated Aug. 5, 2022 (10 pages).

* cited by examiner

SYSTEM AND METHOD FOR DETERMINING SOIL CLOD PARAMETERS OF A FIELD USING THREE-DIMENSIONAL IMAGE DATA

FIELD OF THE INVENTION

The present disclosure generally relates to systems and methods for identifying characteristics of a field and, more particularly, to systems and methods for determining soil clod parameters of a field using three-dimensional image data.

BACKGROUND OF THE INVENTION

It is well known that to attain the best agricultural performance from a piece of land, a farmer must cultivate the soil, typically through a tillage operation. Common tillage operations include plowing, harrowing, and sub-soiling. Farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

For example, modern farm practices demand a smooth, level field with small clods of soil in the fall and spring of the year. In this respect, residue must be cut, sized, and mixed with soil to encourage the residue to decompose and not build up following subsequent passes of machinery. To achieve such soil conditions, it is known to use rolling baskets, such as crumbler reels, to produce smaller, more uniform clod sizes and to aid in the mixing of residue. However, the ability of an operator to assess the effectiveness of a tillage operation in breaking down soil clods and/or otherwise providing desired surface conditions for the field is quite limited. As such, systems have been developed that determine certain soil clod parameters. While such systems work well, further improvements are needed.

Accordingly, an improved system and method for determining soil clod parameters of a field would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a method for determining soil clod parameters of a field. The method includes receiving, with a computing system, three-dimensional image data depicting an imaged portion of the field. The three-dimensional image data, in turn, includes a first two-dimensional image depicting the imaged portion of the field relative to a first position and a second two-dimensional image depicting the imaged portion of the field relative to a second position, with the first position being spaced apart from the second position. Furthermore, the method includes identifying, with the computing system, a soil clod depicted with the received three-dimensional image data. Additionally, the method includes comparing, with the computing system, the first and second two-dimensional images to identify a shadow surrounding at least a portion of the identified soil clod. Moreover, the method includes determining, with the computing system, a soil clod parameter associated with the identified soil clod based on the identified shadow.

In another aspect, the present subject matter is directed to a system for determining soil clod parameters of a field. The system includes an imaging device configured to capture three-dimensional image data depicting an imaged portion of the field. The captured three-dimensional image data, in turn, includes a first two-dimensional image depicting the imaged portion of the field relative to a first position and a second two-dimensional image depicting the imaged portion of the field relative to a second position, with the first position being spaced apart from the second position. Furthermore, the system includes a computing system communicatively coupled to the imaging device. In this respect, the computing system is configured to identify a soil clod depicted with the captured three-dimensional image data. Additionally, the computing system is configured to compare the first and second two-dimensional images to identify a shadow surrounding at least a portion of the identified soil clod. Moreover, the computing system is configured to determine a soil clod parameter associated with the identified soil clod based on the identified shadow.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining soil clod parameters of a field. Specifically, the disclosed system and method may use three-dimensional (3D) image to determine the soil clod parameters. The 3D image data may include or otherwise be formed from a first two-dimensional (2D) image depicting the imaged portion of the field relative to a first position and a second 2D image depicting the imaged portion of the field relative to a different, second position. Because the first and second 2D images are captured relative to different positions, a shadow surrounding each soil clod may be present within the 3D image data. As will be described below, this shadow is a region of the imaged portion of the field that is depicted in one of the first or second 2D images but blocked by a soil clod in the other of the first or second 2D images.

In several embodiments, a computing system may determine one or more soil clod parameters based on the shadows present within captured 3D image data. More specifically, as an agricultural machine travels across a field, the computing system may receive 3D image data depicting an imaged portion of the field from one or more imaging device(s). The computing system may analyze the received 3D image data to identify one or more soil clods depicted therein. For example, the computing system may be configured to execute one or more image processing algorithms and/or computer vision techniques (e.g., an edge-finding algorithm) to identify the soil clods. Furthermore, the computing system may compare the first and second 2D images to identify a shadow surrounding at least a portion of each identified soil clod. Specifically, the computing system may determine that any region depicted within one of the first or second 2D images that is not depicted in the other of the first or second 2D images is a shadow. Thereafter, the computing system may determine one or more soil clod parameters associated with the identified soil clod (e.g., the amount of the identified soil clod that is buried within the soil) based on the identified shadow. For example, in some embodiments, the computing system may determine the area of the shadow surrounding each identified soil clod and then determine a soil clod parameter(s) for each identified soil clod based on the area of the corresponding shadow.

Using the shadows present within captured 3D image data depicting an imaged portion of the field generally improves agricultural operations. More specifically, many soil clods are partially buried within the soil of the field. Conventional systems for determining soil clod parameters are unable to account for the portion of the soil clod that is buried when determining soil clod parameters. However, by using the shadows present within 3D image data, the disclosed system and method can determine the amount or portion of the soil clod that is buried within the soil of the field. Thus, the disclosed systems and methods generally allow for more accurate control of tillage implement tools (e.g., the basket assemblies), which improves the effectiveness of the tillage operation and the subsequent agricultural performance of the field.

Figure 1:
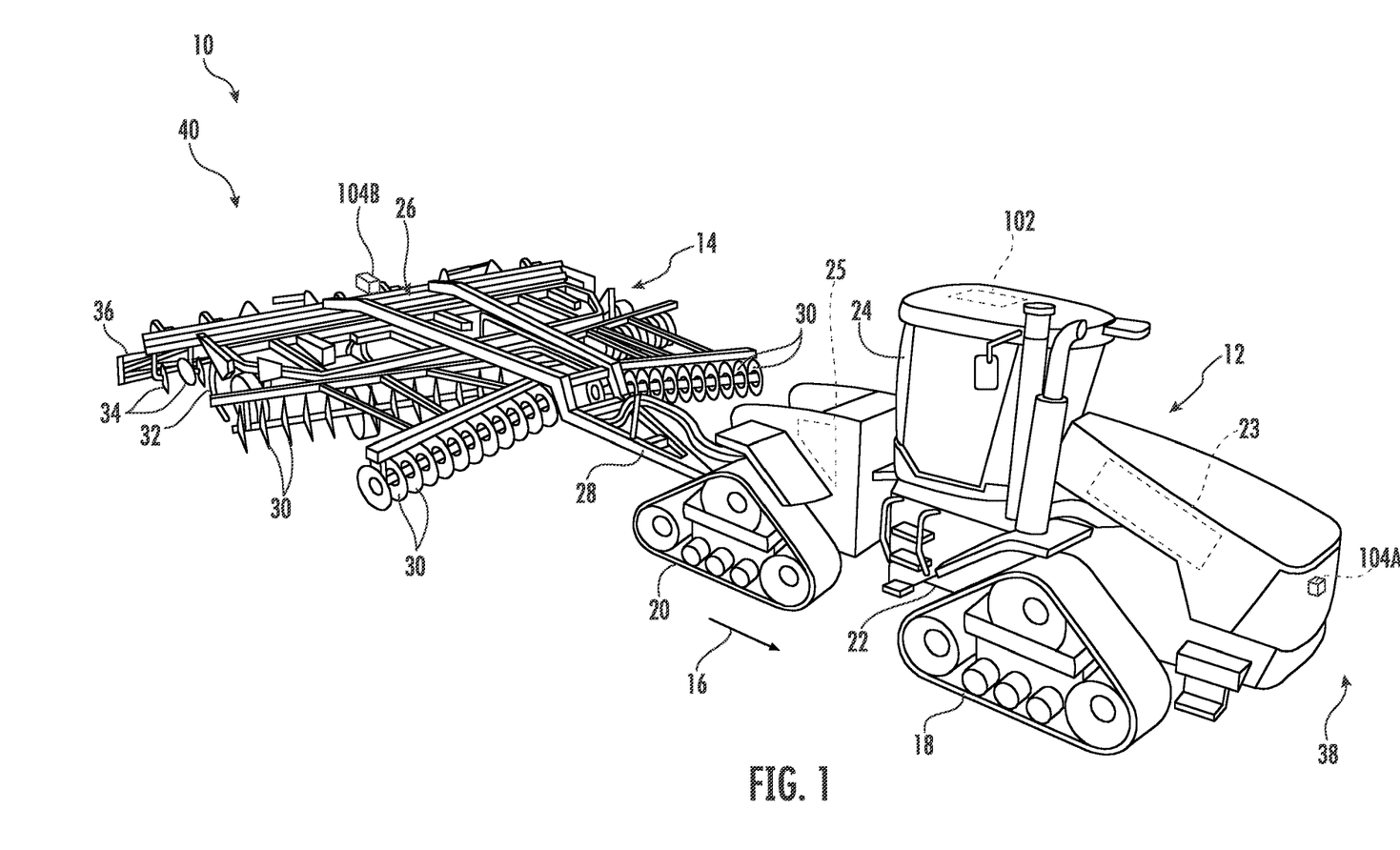
FIG. 1 illustrates a perspective view of one embodiment of an agricultural machine in accordance with aspects of the present subject matter.

Referring now to drawings, FIG. 1 illustrates a perspective view of one embodiment of an agricultural machine 10 in accordance with aspects of the present subject matter. As shown, in the illustrated embodiment, the agricultural machine 10 includes a work vehicle 12 and an associated agricultural implement 14. In general, the work vehicle 12 is configured to tow the implement 14 across a field in a direction of travel (indicated by arrow 16). In the illustrated embodiment, the work vehicle 12 is configured as an agricultural tractor and the implement 14 is configured as an associated tillage implement. However, in other embodiments, the work vehicle 12 may be configured as any other suitable type of vehicle, such as an agricultural harvester, a self-propelled sprayer, and/or the like. Similarly, the implement 14 may be configured as any other suitable type of implement, such as a planter. Furthermore, the agricultural machine 10 may correspond to any suitable powered and/or unpowered agricultural machine (including suitable vehicles and/or equipment, such as only a work vehicle or only an implement). Additionally, the agricultural machine 10 may include more than two associated vehicles, implements, and/or the like (e.g., a tractor, a planter, and an associated air cart).

As shown in FIG. 1, the work vehicle 12 includes a pair of front track assemblies 18, a pair or rear track assemblies 20, and a frame or chassis 22 coupled to and supported by the track assemblies 18, 20. An operator's cab 24 may be supported by a portion of the chassis 22 and may house various input devices for permitting an operator to control the operation of one or more components of the work vehicle 12 and/or one or more components of the implement 14. Additionally, the work vehicle 12 may include an engine 23 and a transmission 25 mounted on the chassis 22. The transmission 25 may be operably coupled to the engine 23 and may provide variably adjusted gear ratios for transferring engine power to the track assemblies 18, 20 via a drive axle assembly (not shown) (or via axles if multiple drive axles are employed).

Additionally, as shown in FIG. 1, the implement 14 may generally include a carriage frame assembly 26 configured to be towed by the work vehicle 12 via a pull hitch or tow bar 28 in the direction of travel 16 of the vehicle 12. In general, the carriage frame assembly 26 may be configured to support a plurality of ground-engaging tools, such as a plurality of shanks, disk blades, leveling blades, basket assemblies, tines, spikes, and/or the like. For example, in the illustrated embodiment, the carriage frame assembly 26 is configured to support various gangs of disc blades 30, a plurality of ground-engaging shanks 32, a plurality of leveling blades 34, and a plurality of crumbler wheels or basket assemblies 36. However, in alternative embodiments, the carriage frame assembly 26 may be configured to support any other suitable ground-engaging tools and/or combination of ground-engaging tools. In several embodiments, the various ground-engaging tools may be configured to perform a tillage operation or any other suitable ground-engaging operation across the field along which the implement 14 is being towed. In addition to being towed by the work vehicle 12, the implement 14 may also be a semi-mounted implement connected to the work vehicle 12 via a two-point hitch (not shown) or the implement 14 may be a fully mounted implement (e.g., mounted the work vehicle's 12 three-point hitch (not shown)).

It should be appreciated that the configuration of the agricultural machine 10 described above and shown in FIG. 1 is provided only to place the present subject matter in an exemplary field of use. Thus, it should be appreciated that the present subject matter may be readily adaptable to any manner of machine configuration, including any suitable work vehicle configuration and/or implement configuration. For example, in an alternative embodiment of the work vehicle 12, a separate frame or chassis may be provided to which the engine, transmission, and drive axle assembly are coupled, a configuration common in smaller tractors. Still other configurations may use an articulated chassis to steer the work vehicle 12 or rely on tires/wheels in lieu of the track assemblies 16, 18. Similarly, as indicated above, the carriage frame assembly 26 of the implement 14 may be configured to support any other suitable combination of type of ground-engaging tools.

Moreover, a location sensor 102 may be provided in operative association with the agricultural machine 10. For instance, as shown in FIG. 1, the location sensor 102 is installed on or within the vehicle 12. However, in other embodiments, the location sensor 102 may be installed on or within the implement 14. In general, the location sensor 102 may be configured to determine the current location of the vehicle 12 and/or the implement 14 using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the location sensor 102 may be transmitted to a computing system of the agricultural machine 10 (e.g., in the form coordinates) and stored within the computing system's memory for subsequent processing and/or analysis. For instance, based on the known dimensional configuration and/or relative positioning between the vehicle 12 and the implement 14, the determined location from the location sensor 102 may be used to geo-locate the implement 14 within the field.

Furthermore, in accordance with aspects of the present subject matter, the agricultural machine 10 may include one or more imaging devices 104 coupled thereto and/or supported thereon. As will be described below, the imaging device(s) 104 may be configured to capture 3D image data depicting the soil clods present within the field across which the agricultural machine 10 is traveling.

In several embodiments, the imaging device(s) 104 may be provided in operative association with the agricultural machine 10 such that the imaging device(s) 104 has a field(s) of view directed towards a portion(s) of the field adjacent to the work vehicle 12 and/or the implement 14, such as a portion(s) of the field disposed in front of, behind, and/or along one or both of the sides of the work vehicle 12 and/or the implement 14. For example, as shown in FIG. 1, in one embodiment, an imaging device(s) 104A may be provided at a forward end 38 of the work vehicle 12 to allow the imaging device(s) 104A to capture 3D image data of a section of the field disposed in front of the work vehicle 12. Such a forward-located imaging device(s) 104A may allow pre-tillage images of the field to be captured for monitoring or determining soil clod parameters of the field prior to the performance of a tillage operation. Similarly, as shown in FIG. 1, a second imaging device(s) 104B may be provided at or adjacent to an aft end 40 of the implement 14 to allow the imaging device(s) 104B to capture 3D image data of a section of the field disposed behind the implement 14. Such an aft-located imaging device(s) 104B may allow post-tillage images of the field to be captured for monitoring or determining soil clod parameters of the field after the performance of a tillage operation. In alternative embodiments, the imaging device(s) 104 may be installed at any other suitable location(s) on the work vehicle 12 and/or the implement 14. Additionally, in other embodiments, the agricultural machine 10 may only include a single imaging device(s) 104 mounted on either the work vehicle 12 or the implement 14 or may include more than two imaging device(s) 104 mounted on the work vehicle 12 and/or the implement 14.

Moreover, each imaging device(s) 104 may be mounted or otherwise supported relative to a portion of the agricultural machine 10 using any suitable mounting/support structure. For instance, in one embodiment, each imaging device(s) 104 may be directly or indirectly mounted to a portion of the work vehicle 12 and/or the implement 14. Specifically, in one embodiment, suitable mounting structure (e.g., mounting arms, brackets, trays, etc.) may be used to support each imaging device(s) 104 out in front of the vehicle 12 or behind the implement 14 (e.g., in a cantilevered arrangement) to allow the imaging device(s) 104 to obtain the desired field of view, including the desired orientation of the device's field of view relative to the field (e.g., a straight-down view oriented generally perpendicular to the surface of the field).

In general, the imaging device(s) 104 may correspond to any suitable device(s) or other assembly configured to capture 3D image data of the field. For instance, in several embodiments, the imaging device(s) 104 may correspond to a stereo camera assembly having first and second cameras 106, 108 (FIG. 2) incorporated therein or otherwise forming a part thereof. In such embodiments, the stereo camera assembly may be used to capture 3D images or other 3D image data of the field. Specifically, each camera 106, 108 may include a lens (not shown) and a separate image sensor (not shown) for capturing 2D images of the field. Additionally, by simultaneously capturing a 2D image of the same portion of the field with each camera 106, 108, the separate images can be combined, compared, and/or otherwise processed to generate a three-dimensional image of such portion of the field.

Figure 2:
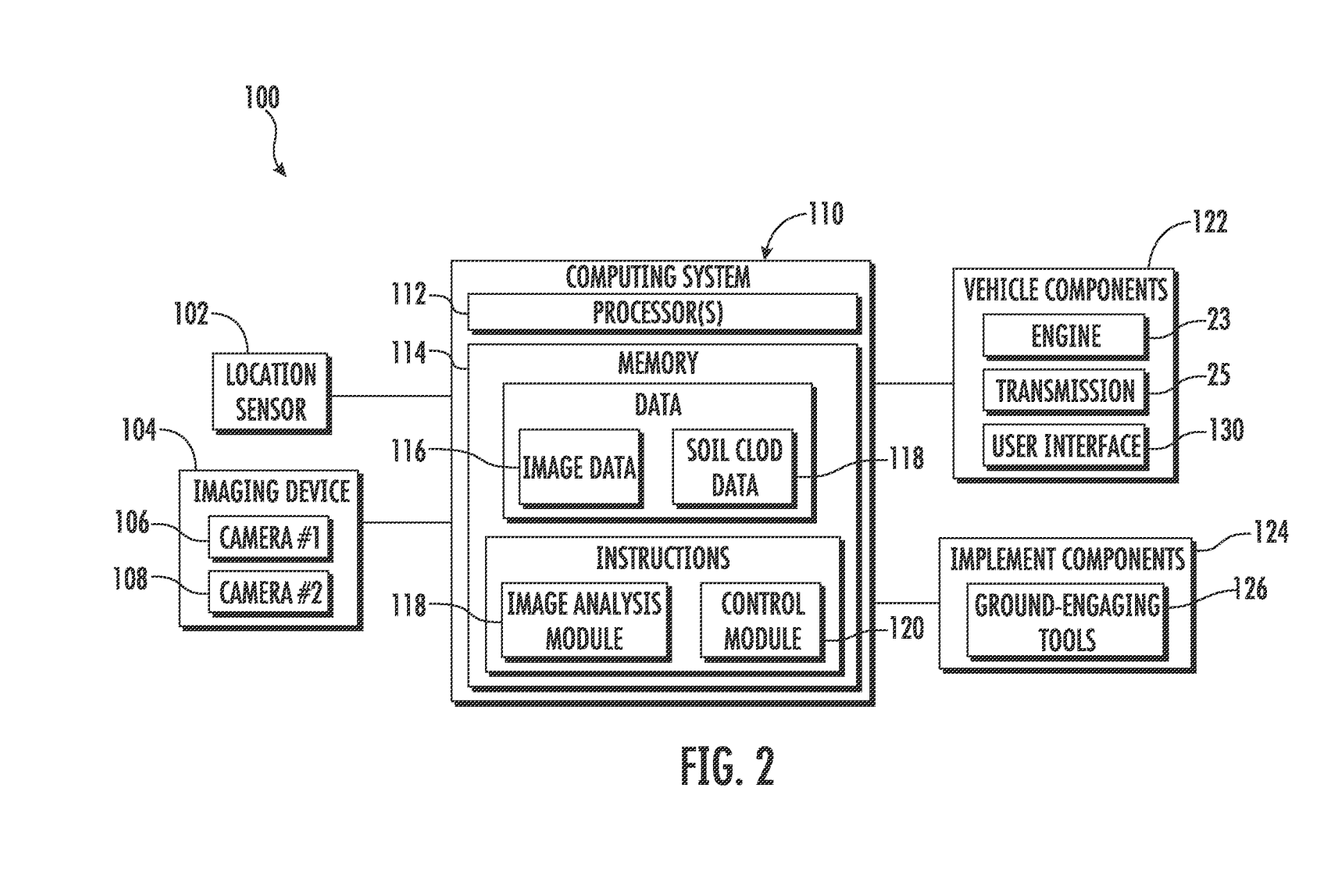
FIG. 2 illustrates a schematic view of one embodiment of a system for determining soil clod parameters of a field in accordance with aspects of the present subject matter.

Referring now to FIG. 2, a schematic view of one embodiment of a system 100 for determining soil clod parameters of a field is illustrated in accordance with aspects of the present subject matter. In general, the system 100 will be described herein with reference to the agricultural machine 10 described above with reference to FIG. 1. However, it should be appreciated by those of ordinary skill in the art that the disclosed system 100 may generally be utilized with agricultural machines having any other suitable machine configuration.

As shown in FIG. 2, the system 100 may include one or more components of the agricultural machine 10 described above with reference to FIG. 1. For example, in several embodiments, the system 100 may include a location sensor (e.g., the location sensor 102 shown in FIG. 1) configured to capture data associated with the location of the agricultural machine 10 within the field. Furthermore, in several embodiments, the system 100 may include one or more of the imaging device(s) (e.g., imaging devices 104 shown in FIG. 1) configured to capture 3D image data of a portion(s) of the field disposed adjacent to the work vehicle 12 and or the implement 14. As indicated above, in one embodiment, the imaging device(s) 104 may correspond to a stereo camera assembly(ies), with each stereo camera assembly having first and second cameras 106, 108. Each camera 106, 108 may, in turn, be configured to capture 2D images of the field that can be used to form 3D image of the field. Additionally, the system 100 may include or be associated with one or more other components of the work vehicle 12 and/or the implement 14.

The system 100 may further include a computing system 110 communicatively coupled to location sensor 102 and/or the imaging device(s) 104. In several embodiments, the computing system 110 may be configured to receive location data (e.g., coordinates) captured by the location sensor 102 to allow the location of the agricultural machine 10 within the field to be determined. Moreover, the computing system 110 may be configured to receive and process the 3D image data captured by the imaging device(s) 104 to allow one or more soil clod parameters associated with the imaged portions of the field to be determined. For instance, as will be described below, the computing system 110 may be configured to execute one or more suitable image processing algorithms for determining the soil clod parameter(s) of the field based on the captured 3D image data.

In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the image processing algorithm(s) and/or related method(s) described below. In addition, the computing system 110 may also include various other suitable components, such as a communications circuit or module, one or more input/output channels, a data/control bus and/or the like.

The computing system 110 may correspond to an existing controller of the work vehicle 12 or the implement 14 or the computing system 110 may correspond to a separate processing device. For instance, in one embodiment, the computing system 110 may form all or part of a separate plug-in module or computing device that is installed relative to the work vehicle 12 or implement 14 to allow for the disclosed system and method to be implemented without requiring additional software to be uploaded onto existing control devices of the work vehicle 12 or implement 14.

In several embodiments, the memory 114 of the computing system 110 may include one or more databases for storing information received and/or generated by the computing system 110. For instance, as shown in FIG. 2, the memory 114 may include an image database 116 storing the 3D image data captured by the imaging device(s) 104, including the images themselves (e.g., the 2D images captured by the cameras 106, 108) and/or data deriving from the images (e.g., disparity maps or 3D depth images generated based on the 2D images captured by the cameras 106, 108). Additionally, the memory 114 may include a soil clod database 119 storing data associated with the soil clod parameter(s) being determined by the computing system 110. For instance, as will be described below, the images and related data deriving from the imaging device(s) 104 may be used to determine one or more soil clod parameter(s) of the field. In such instance, the soil clod parameter data generated by the computing system 110 may be stored within the soil clod database 119 for subsequent processing and/or analysis.

Moreover, as shown in FIG. 2, in several embodiments, the instructions stored within the memory 114 of the computing system 110 may be executed by the processor(s) 112 to implement an image analysis module 119. In general, the image analysis module 119 may be configured to process/analyze the 3D image data received from the imaging device(s) 104 and/or the data deriving therefrom to estimate or determine one or more soil clod parameters associated with the field. Specifically, in several embodiments, the image analysis module 119 may be configured to execute one or more image processing algorithms, such as the imaging processing algorithms described herein, to allow the soil clod parameter(s) of the field to be estimated or determined by the computing system 110.

Referring still to FIG. 2, in one embodiment, the instructions stored within the memory 114 of the computing system 110 may also be executed by the processor(s) 112 to implement a control module 120. In general, the control module 120 may be configured to electronically control the operation of one or more components of the agricultural machine 10. For instance, in several embodiments, the control module 120 may be configured to control the operation of the agricultural machine 10 based on the determined soil clod parameter(s) of the field. Such control may include controlling the operation of one or more components 122 of the work vehicle 12, such as the engine 23 and/or the transmission 25 of the vehicle 12 to automatically adjust the ground speed of the agricultural machine 10. In addition (or as an alternative thereto), the control module 120 may be configured to electronically control the operation of one or more components 124 of the implement 14. For instance, the control module 120 may be configured to adjust the operating parameters associated with (e.g., position of, force being applied, etc.) one or more of the ground-engaging tools 126 of the implement 14 (e.g., the disc blades 30, shanks 32, leveling blades 34, and/or basket assemblies 36) to proactively or reactively adjust the operation of the implement 14 in view of the monitored soil clod parameter(s).

Although the various control functions and/or actions will generally be described herein as being executed by the computing system 110, one or more of such control functions/actions (or portions thereof) may be executed by a separate computing system or may be distributed across two or more computing systems (including, for example, the computing system 110 and a separate computing system). For instance, in one embodiment, the computing system 110 may be configured to acquire data from the imaging device(s) 104 for subsequent processing and/or analysis by a separate computing system (e.g., a computing system associated with a remote server). In another embodiment, the computing system 110 may be configured to execute the image analysis module 119 to determine one or more soil clod parameters of the field, while a separate computing system (e.g., a vehicle computing system associated with the agricultural machine 10) may be configured to execute the control module 120 to control the operation of the agricultural machine 10 based on data and/or instructions transmitted from the computing system 110 that are associated with the determined soil clod parameter(s).

Figure 3:
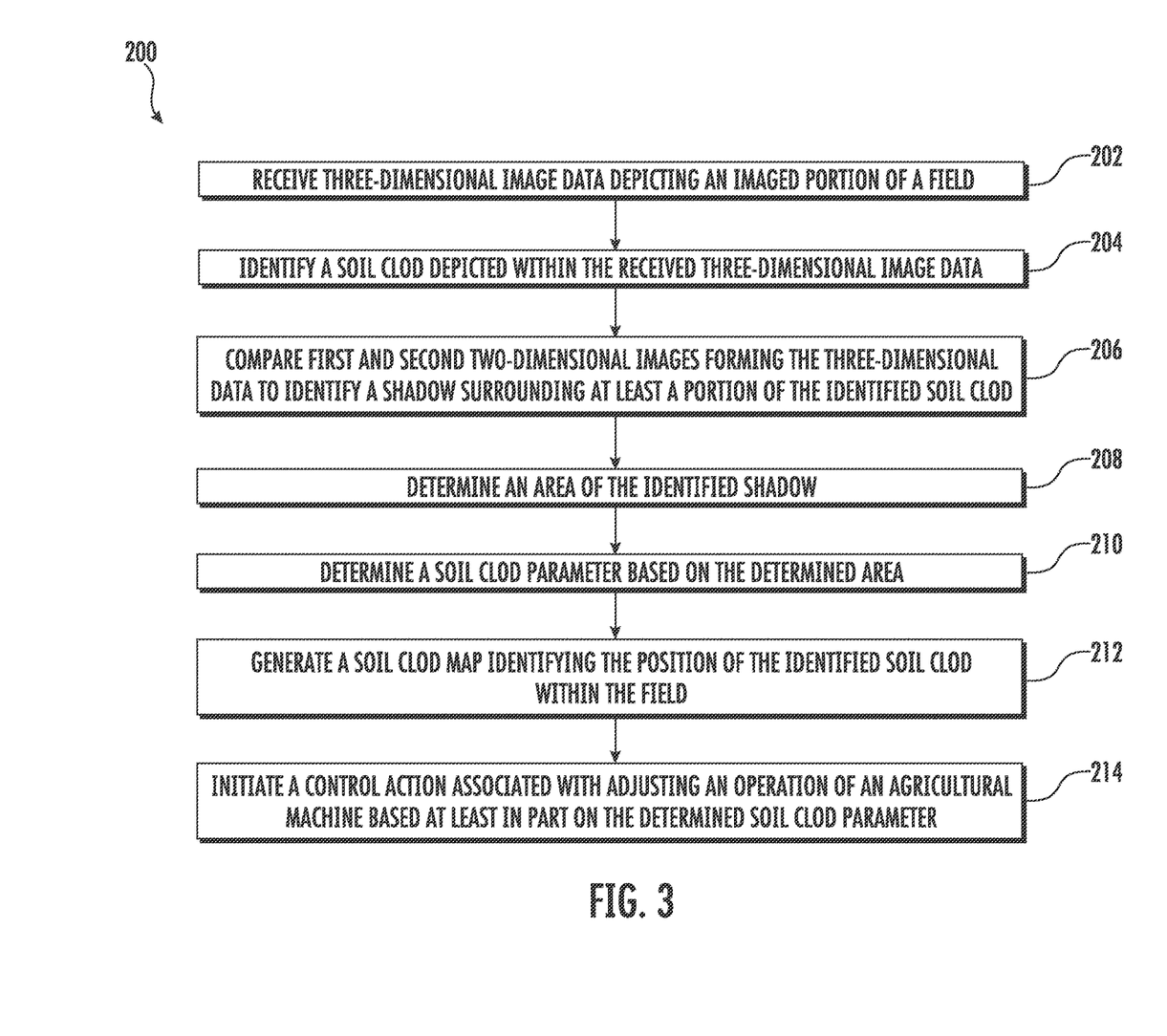
FIG. 3 illustrates a flow diagram providing one embodiment of example control logic for determining soil clod parameters of a field in accordance with aspects of the present subject matter.

Referring now to FIG. 3, a flow diagram of one embodiment of example control logic 200 that may be executed by the computing system 110 (or any other suitable computing system) for determining soil clod parameters of a field is illustrated in accordance with aspects of the present subject matter. Specifically, the control logic 200 shown in FIG. 3 is representative of steps of one embodiment of an image processing algorithm that can be executed to determine soil clod parameters of imaged portions of a field with substantial accuracy and without requiring substantial computing resources and/or processing time. Thus, in several embodiments, the control logic 200 may be advantageously utilized in association with a system installed on or forming part of an agricultural machine to allow for real-time determination of soil clod parameters of a field as the machine travels across the field during the performance of an agricultural operation. However, in other embodiments, the control logic 200 may be used in association with any other suitable system, application, and/or the like for determining soil clod parameters of a field.

As shown in FIG. 3, at (202), the control logic 200 includes receiving three-dimensional image data depicting an imaged portion of the field. For example, as indicated above, the computing system 110 may be communicatively coupled to the imaging device(s) 104. In this respect, as the agricultural machine 10 travels across the field (e.g., to perform a tillage operation thereon), the computing system 110 may receive 3D image data captured by the imaging device(s) 104. The received 3D image data may include sequentially captured pairs of 2D images that may be used to form a 3D image of the field. For example, each pair of 2D images may include a first 2D image of the imaged portion of the field captured by the first camera 106 and a second 2D image of the imaged portion of the field captured by the second camera 108. As will be described below, the first and second 2D images forming the 3D image data may be compared to identify a shadow(s) present therein. Thereafter, the identified shadow(s) may be used to determine one or more soil clod parameter(s) associated with soil clods present within the imaged portion of the field.

Furthermore, at (204), the control logic 200 includes identifying a soil clod depicted within the received three-dimensional data. Specifically, in several embodiments, the computing system 110 may be configured to analyze/process the received 3D image data (e.g., the 3D image data received at (202)) to identify one or more soil clods present within the imaged portion of the field. For example, the image analysis module 119 of the computing system 110 may use one or more image processing algorithms and/or computer vision techniques to identify soil clods depicted within the received 3D image data. Such image processing algorithms and/or computer vision techniques may include, for example, an edge-finding routine in which the edges of each soil clod depicted within the received 3D image are identified. However, in alternative embodiments, the computing system 110 may be configured to identify soil clods present within the imaged portion of the field in any other suitable manner.

Figure 4:
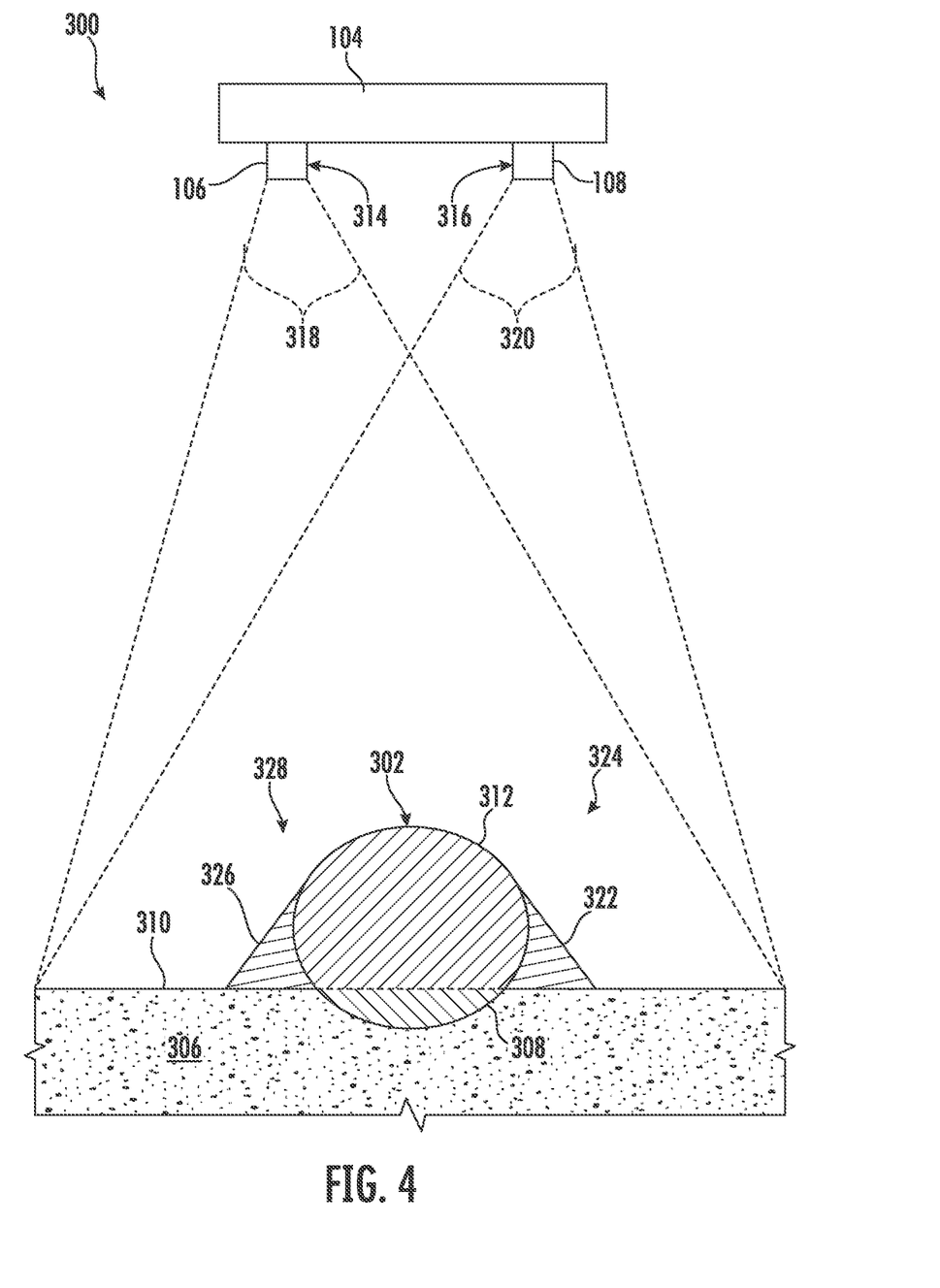
FIG. 4 is an example view of a soil clod present within an imaged portion of a field in accordance with aspects of the present subject matter, particularly illustrating a shadow formed by the soil clod.

In general, the soil clods within the imaged portion of the field may generally result in the presence of shadows within the captured 3D image data. More specifically, FIG. 4 illustrates an example view of a soil clod 302 present within an imaged portion of a field 300. As shown, the soil clod 302 is partially buried within soil 306 of the field 300. Thus, the soil clod 302 includes a buried portion 308 positioned below a top surface 310 of the field 300 and a projecting portion 312 that extends upward from the top surface 310.

Moreover, as indicated above, the image device 104 includes a first camera 106 positioned relative to a first position 314 and a second camera 108 positioned relative to a second position 316, with the first and second portions 314, 316 being spaced apart from each other. Thus, the first camera 106 has a first field of view 318, while the second camera 108 has a second field of view 318. That is, the first and second cameras 106, 108 view the imaged portion of the field 300 from differing positions. In this respect, the projecting portion 312 of the soil clod 302 blocks regions of the imaged portion of the field from each camera 106, 108. Specifically, the soil clod 302 blocks a first region of the imaged portion of the field 300 (indicated by cross-hatched area 322) on a first side 324 of the soil clod 302. Similarly, the soil clod 302 blocks a second region of the imaged portion of the field 300 (indicated by cross-hatched area 326) on a different, second side 328 of the soil clod 302. As such, the differing positions of the first and second cameras 106, 108 necessary to capture 3D image data and the extension of the projecting portion 312 of the soil clod 302 above the top surface 310 of the field 300 result in regions of the imaged portion of the field 300 being depicted in only one of the 2D images captured by the cameras 106, 108. Any region of the imaged portion of the field 300 depicted in the 2D image captured by one of the cameras 106, 108 but not in the 2D image captured by the other of the cameras 106, 108 is referred to as a shadow.

Referring again to FIG. 3, at (206), the control logic 200 includes comparing the first and second two-dimensional images to identify a shadow surrounding at least a portion of the identified soil clod. More specifically, as described above, each 3D image of the imaged portion of the field may generally be formed from or based on a pair of 2D images that are simultaneously captured by cameras located at different positions (e.g., the cameras 106, 108). As such, in several embodiments, the computing system 110 may be configured to compare each pair of simultaneously 2D images to identify a shadow(s) surrounding at least a portion of the identified soil clod(s). That is, the computing system 110 may compare each pair of simultaneously 2D image to identify a region(s) of the imaged portion of the field that is depicted in one 2D image but not in the other 2D image. For example, the computing system 110 may execute the image analysis module 119 to compare the corresponding 2D images and identify a shadow(s) surrounding the identified soil clod(s).

As described above, the shadow(s) identified at (206) are created based on the differing positions from which the 2D images forming the 3D image data are captured. Thus, the shadow(s) are not created by artificial or supplemental light from an artificial light source (e.g., an LED) illuminating the imaged portion of the field. Moreover, it is not necessary to know the position of the sun relative to the imaged portion of the field.

Additionally, at (208), the control logic 200 includes determining the area of the identified shadow. Specifically, in several embodiments, the computing system 100 may determine the area of the shadows identified in the image data (e.g., the shadows identified at (206)). As such, the computing system 116 may be configured to execute the image analysis module 119 to determine or estimate the area(s) of the identified shadow(s). For example, the area of a shadow may be determined by counting the total number of pixels contained within the shadow.

Moreover, as shown in FIG. 3, at (210), the control logic 200 includes determining a soil clod parameter based on the determined area. Specifically, in several embodiments, the computing system 100 may determine or estimate one or more parameters associated with the identified soil clod(s) based on the corresponding shadow. For example, the computing system 110 may be configured to the image analysis module 119 to correlate the determined area(s) of the identified shadow(s) to the parameter(s) associated with the corresponding soil clod(s).

Any suitable parameter(s) associated with the identified soil clod(s) may be determined at (210). For example, in several embodiments, at (210), the computing system 110 may determine the amount or portion of the identified soil clod(s) that is buried within the soil of the field based on the determined area of the corresponding shadow. More specifically, a soil clod having only a small portion thereof buried within the soil may generally extend or otherwise project upward from the top surface of the field more than a soil clod having a large portion thereof buried within the soil. In this respect, a soil clod having only a small portion thereof buried within the soil typically blocks more of the fields of view of the first and second cameras 106, 108 than a soil clod having a large portion thereof buried within the soil. As such, a soil clod having only a small portion thereof buried within the soil is generally surrounded by a larger shadow than a soil clod having a large portion thereof buried within the soil. Thus, the area of a shadow surrounding a soil clod can be used to determine the amount or portion of that soil clod buried within the soil. Alternatively, the computing system 110 may determine any other suitable parameter(s) associated within a soil clod based on the determined area of the corresponding shadow, such as its size, shape, length, width, etc.

In addition, at (212), the control logic 200 includes generating a soil clod map identifying the position of the identified soil clod within the field. More specifically, as the agricultural machine 10 travels across the field, the computing system 110 may be configured to receive location data (e.g., coordinates) from the location sensor 102. Based on the known dimensional configuration and/or relative positioning between the imaging devices(s) 104 and the location sensor 102, the computing system 110 may geo-locate each identified soil clod within the field. For example, in one embodiment, the coordinates derived from the location sensor 102 and the soil clod identifications may both be time-stamped. In such an embodiment, the time-stamped data may allow the soil clod identifications to be matched or correlated to a corresponding set of location coordinates received or derived from the location sensor 102. Thereafter, the computing system 110 may be configured to generate a soil clod map identifying the position of each identified soil clod within the field.

Furthermore, at (214), the control logic 200 includes initiating a control action associated with adjusting the operation of an agricultural machine based at least in part on the determined soil clod parameter. Specifically, in several embodiments, the computing system 110 may be configured to execute the control module 120 to initiate a control action based on the determined soil clod parameter(s), such as when the determined soil clod parameter(s) falls outside of a desired range(s) or does not meet or satisfy an associated threshold(s). For example, in one embodiment, the computing system 110 may be configured to provide a notification to the operator of the agricultural machine 10 indicating that the determined soil clod parameter(s) is not at a desired level. For instance, in one embodiment, the computing system 110 may cause a visual or audible notification or indicator to be presented to the operator via an associated user interface (not shown) provided within the cab 24 of the vehicle 12.

In other embodiments, the computing system 110 may be configured to execute an automated control action designed to adjust the operation of the agricultural machine 10 based at least in part on the determined soil clod parameter. For instance, in one embodiment, the computing system 110 may be configured to increase or decrease the operational or ground speed of the agricultural machine 10 to adjust the monitored soil clod parameter(s). In addition to the adjusting the ground speed of the agricultural machine 10 (or as an alternative thereto), the computing system 110 may also be configured to adjust an operating parameter associated with the ground-engaging tools of the implement 12. For instance, the computing system 110 may control the operation of one or more actuators (not shown) configured to adjust the position of and/or force being applied to the basket assemblies 56 of the implement 14 based at least in part on the determined soil clod parameter(s).

Figure 5:
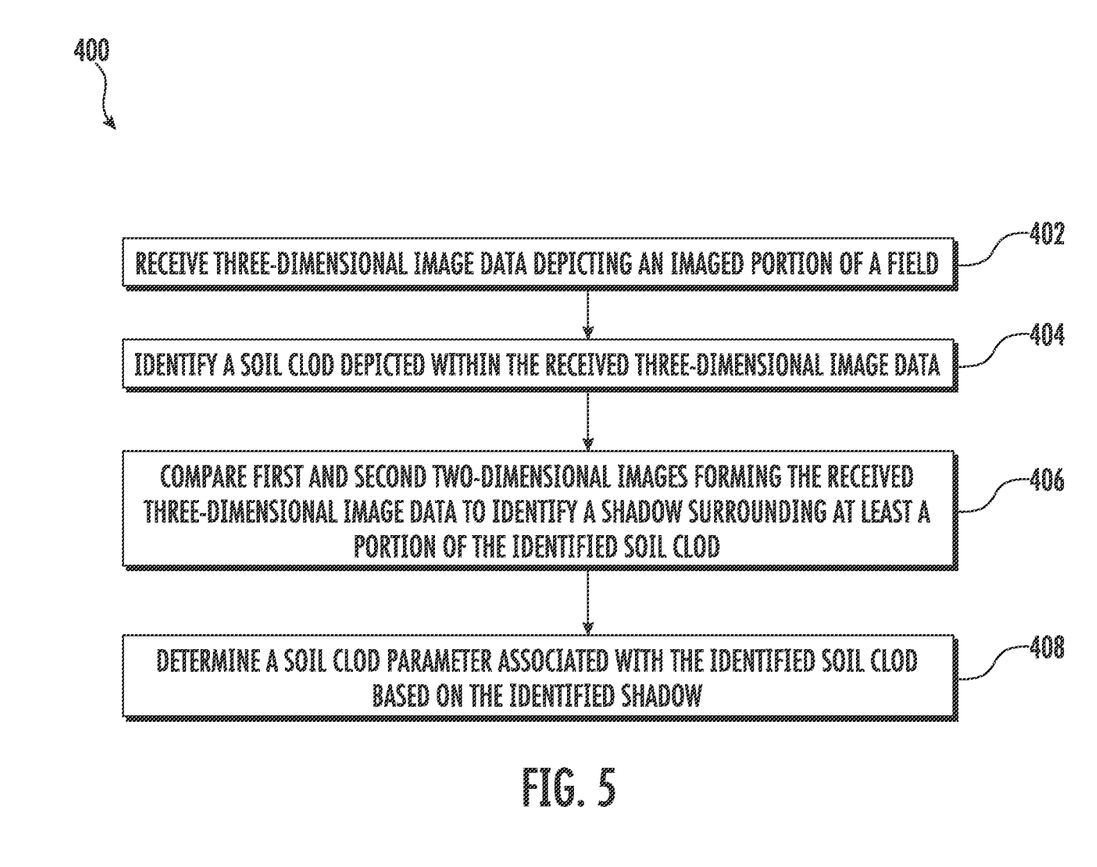
FIG. 5 illustrates a flow diagram of one embodiment of a method for determining soil clod parameters of a field in accordance with aspects of the present subject matter.

Referring now to FIG. 5, a flow diagram of one embodiment of a method 400 for determining soil clod parameters of a field is illustrated in accordance with aspects of the present subject matter. In general, the method 400 will be described herein with reference to the agricultural machine 10 and the system 100 described above with reference to FIGS. 1 and 2. However, it should be appreciated by those of ordinary skill in the art that the disclosed method 400 may generally be implemented with any agricultural machine having any suitable machine configuration and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (402), the method 400 may include receiving, with a computing system, three-dimensional image data depicting an imaged portion of a field. For instance, as described above, the computing system 110 may receive 3D image data from the imaging device(s) 104 of the agricultural machine 10 as the machine 10 travels across a field to perform a tillage operation. Such 3D image data may, in turn, include pairs of simultaneously captured 2D images depicting soil clods present within the field.

Additionally, at (404), the method 400 may include identifying, with the computing system, a soil clod depicted with the received three-dimensional image data. For instance, as described above, the computing system 110 may analyze the received 3D image data to identify one or more soil clods present within the field using any suitable image processing and/or computer vision techniques.

Moreover, as shown in FIG. 5, at (406), the method 400 may include comparing, with the computing system, the first and second two-dimensional images forming the received three-dimensional image data to identify a shadow surrounding at least a portion of the identified soil clod. For instance, as described above, the computing system 110 may compare first and second 2D images forming the received 3D image data to identify a shadow(s) surrounding at least a portion of the identified soil clod(s).

Furthermore, at (408), the method 400 may include determining, with the computing system, a soil clod parameter associated with the identified soil clod based on the identified shadow. For instance, as described above, the computing system 110 may determine one or more soil clod parameters associated with the identified soil clod(s) based on the corresponding shadow, such as the amount(s) of the soil clod(s) buried within the soil, the size(s) of the soil clod(s), the shape(s) of the soil clod(s), and/or the like.

It is to be understood that the steps of the control logic 200 and the method 400 are performed by the computing system 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 110 described herein, such as the control logic 200 and the method 400, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the control logic 200 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A method for determining soil clod parameters of a field, the method comprising:
receiving, with a computing system, three-dimensional image data depicting an imaged portion of the field, the three-dimensional image data including a first two-dimensional image depicting the imaged portion of the field relative to a first position and a second two-dimensional image depicting the imaged portion of the field relative to a second position, the first position being spaced apart from the second position;
identifying, with the computing system, a soil clod depicted with the received three-dimensional image data;
comparing, with the computing system, the first and second two-dimensional images to identify a shadow surrounding at least a portion of the identified soil clod;
determining, with the computing system, an area of the identified shadow; and
determining, with the computing system, an amount that the identified soil clod is buried in soil within the imaged portion of the field based on the determined area.

2. The method of claim 1, wherein receiving the three-dimensional image data comprises receiving, with the computing system, the three-dimensional image data from an imaging device supported relative to an agricultural machine, the three-dimensional image data being captured by the imaging device as the agricultural machine travels across the field.

3. The method of claim 2, wherein the imaging device comprises a first camera located at the first position and a second camera located at the second position.

4. The method of claim 2, further comprising: initiating, with the computing system, a control action associated with adjusting an operation of the agricultural machine based at least in part on the determined amount that the identified soil clod is buried in the soil.

5. The method of claim 4, wherein the control action comprises adjusting at least one of a force being applied to or a position of a ground-engaging tool of the agricultural machine.

6. The method of claim 4, wherein the control action comprises adjusting a ground speed at which the agricultural machine travels across the field.

7. The method of claim 1, further comprising:
generating, with the computing system, a soil clod map identifying the position of the identified soil clod to its position within the field.

8. A system for determining soil clod parameters of a field, the system comprising:
an imaging device configured to capture three-dimensional image data depicting an imaged portion of the field, the captured three-dimensional image data including a first two-dimensional image depicting the imaged portion of the field relative to a first position and a second two-dimensional image depicting the imaged portion of the field relative to a second position, the first position being spaced apart from the second position; and
a computing system communicatively coupled to the imaging device, the computing system configured to:
identify a soil clod depicted with the captured three-dimensional image data;
compare the first and second two-dimensional images to identify a shadow surrounding at least a portion of the identified soil clod;
determine an area of the identified shadow; and
determine an amount that the identified soil clod is buried in soil within the imaged portion of the field based on the determined area.

9. The system of claim 8, wherein the imaging device is supported relative to an agricultural machine such that the three-dimensional image data is captured by the imaging device as the agricultural machine travels across the field.

10. The system of claim 9, wherein the imaging device comprises a first camera located at the first position and a second camera located at the second position.

11. The system of claim 9, wherein the computing system is further configured to initiate a control action associated with adjusting an operation of the agricultural machine based at least in part on the determined amount that the identified soil clod is buried in the soil.

12. The system of claim 11, wherein the control action comprises adjusting at least one of a force being applied to or a position of a ground-engaging tool of the agricultural machine.

13. The system of claim 11, wherein the control action comprises adjusting a ground speed at which the agricultural machine travels across the field.

14. The system of claim 8, wherein the computing system is further configured to generate a soil clod map identifying the position of the identified soil clod within the field.

* * * * *